(12) United States Patent
Lantz

(10) Patent No.: US 7,798,217 B2
(45) Date of Patent: Sep. 21, 2010

(54) APPARATUS FOR SEPARATING A MIXTURE OF LIQUIDS OF DIFFERING SPECIFIC GRAVITIES IN A WELLBORE

(76) Inventor: Darrell Lantz, 9905 W. Lauderdale Rd., Collinsville, MS (US) 39325

( * ) Notice: Subject to any disclaimer, the term of this patent is extended or adjusted under 35 U.S.C. 154(b) by 94 days.

(21) Appl. No.: 12/210,640

(22) Filed: Sep. 15, 2008

(65) Prior Publication Data

US 2010/0065267 A1 Mar. 18, 2010

(51) Int. Cl.
*E21B 43/38* (2006.01)

(52) U.S. Cl. ............... 166/265; 166/149; 210/533; 210/121

(58) Field of Classification Search ............... 166/265, 166/149; 210/121, 122, 533
See application file for complete search history.

(56) References Cited

U.S. PATENT DOCUMENTS

| | | | |
|---|---|---|---|
| 2,284,737 A | 6/1942 | Hirshstein | |
| 2,984,360 A | 5/1961 | Smith | |
| 3,167,125 A | 1/1965 | Bryan | |
| 3,957,641 A * | 5/1976 | Jakubek et al. | 210/120 |
| 4,251,361 A | 2/1981 | Grimsley | |
| 4,252,649 A | 2/1981 | Favret | |
| 4,521,312 A * | 6/1985 | Anderson | 210/744 |
| 4,527,633 A * | 7/1985 | McLaughlin et al. | 166/370 |
| 4,730,634 A | 3/1988 | Russell | |
| 4,761,225 A * | 8/1988 | Breslin | 210/104 |
| 4,779,677 A | 10/1988 | Cobb | |
| 4,791,990 A | 12/1988 | Amani | |
| 4,901,798 A | 2/1990 | Amani | |
| 5,002,657 A | 3/1991 | Botts | |
| 5,183,068 A | 2/1993 | Prosser | |
| 5,205,310 A | 4/1993 | Kolpak | |
| 5,443,120 A | 8/1995 | Howell | |
| 5,456,837 A | 10/1995 | Peachey | |
| 5,705,056 A | 1/1998 | Scragg | |
| 5,914,041 A | 6/1999 | Chancellor | |
| 6,092,599 A | 7/2000 | Berry | |
| 6,116,341 A * | 9/2000 | Stuebinger et al. | 166/265 |
| 6,138,758 A * | 10/2000 | Shaw et al. | 166/265 |
| 6,220,823 B1 * | 4/2001 | Newcomer | 417/118 |
| 6,277,286 B1 | 8/2001 | Sontvedt | |
| 6,367,547 B1 * | 4/2002 | Towers et al. | 166/265 |
| 6,368,498 B1 | 4/2002 | Guilmette | |
| 6,550,535 B1 * | 4/2003 | Traylor | 166/265 |
| 6,824,696 B1 | 11/2004 | Tolmie et al. | |
| 6,860,921 B2 * | 3/2005 | Hopper | 95/261 |
| 6,863,125 B2 * | 3/2005 | Ivannikov et al. | 166/105.5 |
| 7,017,663 B2 | 3/2006 | Polderman | |
| 7,255,167 B2 * | 8/2007 | Cognata | 166/265 |
| 7,347,255 B2 * | 3/2008 | Fischer et al. | 166/54 |
| 7,389,816 B2 * | 6/2008 | Cognata | 166/265 |
| 7,610,961 B2 * | 11/2009 | Manin et al. | 166/265 |
| 2002/0023750 A1 * | 2/2002 | Lopes et al. | 166/265 |
| 2008/0035336 A1 * | 2/2008 | Cognata | 166/265 |

* cited by examiner

*Primary Examiner*—Shane Bomar
(74) *Attorney, Agent, or Firm*—Frascogna Courtney, PLLC; Brandt D. Howell, Esq.

(57) ABSTRACT

An apparatus for separating a mixture of liquids of differing specific gravities in a wellbore is disclosed along with a method of installation and operation thereof. This device separates water from hydrocarbons prior to hydrocarbon extraction in order to decrease disposal costs of waste water. The device is designed to be compatible with existing oil wells that have been abandoned because of lack of profitability caused by a high water to oil ratio. The device may also be installed in new wells with a high water concentration.

10 Claims, 3 Drawing Sheets

APPARATUS FOR SEPARATING A MIXTURE OF LIQUIDS OF DIFFERING SPECIFIC GRAVITIES IN A WELLBORE

FIELD OF THE INVENTION

This invention relates generally to water and liquid hydrocarbon separators and specifically to water and liquid hydrocarbon separators that separate fluids underground.

BACKGROUND OF THE INVENTION

Oil wells often produce multiple fluids in addition to oil. Typically, water seeps into subterranean oil reservoirs as the oil is being removed, and is eventually pumped to the surface along with the oil. This water must be separated from the oil before the oil can be used. Once the water has been separated from the oil, the water must be disposed of in a safe and environmentally friendly manner. Water disposal costs typically include storage, shipping, processing, and associated personnel costs.

When a well has produced a significant portion of its oil reserve, additional water often begins to seep into the reservoir, causing a significant decrease in oil to water ratio. This increase in water causes increasing water disposal costs and decreasing oil yield. When the costs of water disposal outweigh the income from the oil production, the oil well is considered unprofitable and is capped, often with a significant amount of oil remaining in the well.

Several methods of separating water and oil both above and below ground have been created. However, the present methods each require either expensive equipment, active management, or both.

Therefore, what is needed is an apparatus for separating a mixture of liquids of differing specific gravities in a wellbore. The apparatus should employ a relatively inexpensive process to separate water from valuable liquid hydrocarbons underground, before any liquids have been drawn to the surface, to reduce or eliminate water disposal costs. Furthermore, other desirable features and characteristics of the present invention will become apparent when this background of the invention is read in conjunction with the subsequent detailed description of the invention, appended claims, and the accompanying drawings.

SUMMARY OF THE INVENTION

The present invention advantageously fills the aforementioned deficiencies by providing an apparatus for separating a mixture of liquids of differing specific gravities in a wellbore. The apparatus decreases costs associated with continued exploitation of an oil well.

In one particular embodiment of the present invention, a wellbore that has been capped and abandoned due to high water content is reopened and the present technology is installed. A separation member is selected to have a specific gravity greater than the crude oil present in the well but less than water. The separation member then floats in the interface between the crude oil and water layers. Pressure from a pressure regulating member above the wellbore then repeatedly forces water out of the wellbore while retaining the crude oil for extraction.

In another embodiment, the present technology is installed into an operating well with a high water concentration. A separation member is selected to have a specific gravity greater than the crude oil present in the well but less than water. The separation member then floats in the interface between the crude oil and water layers. A pressure regulating member is configured to monitor the pressure in the wellbore and reduce pressure when an experimentally determined pressure is measured. Pressure from then pressure regulating member above the wellbore repeatedly forces water out of the wellbore while retaining the crude oil for extraction. An extraction member is also present to automatically extract the separated crude oil when the time between periods of increased pressure is reduced to an experimentally determined desired level associated with the particular wellbore.

In still another embodiment, a new well is drilled and the present technology is installed thereto. A separation member is selected to have a specific gravity greater than the crude oil present in the well but less than water. The separation member then floats in the interface between the crude oil and water layers. A pressure regulating member is configured to monitor the pressure in the wellbore and reduce pressure when an experimentally determined pressure is measured. Pressure from then pressure regulating member above the wellbore repeatedly forces water out of the wellbore while retaining the crude oil for extraction. An extraction member is also present to automatically extract the separated crude oil when the time between periods of increased pressure is reduced to an experimentally determined desired level associated with the particular wellbore.

The present invention now will be described more fully hereinafter with reference to the accompanying drawings, which are intended to be read in conjunction with both this summary, the detailed description, and any preferred and/or particular embodiments specifically discussed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The drawings contained herein exemplify one of the embodiments of the claimed invention. It should be noted that the invention is not limited to the embodiment shown. The embodiment shown is purely an example, and the invention is capable of many variations of said embodiment. In the drawings.

Figure 1:
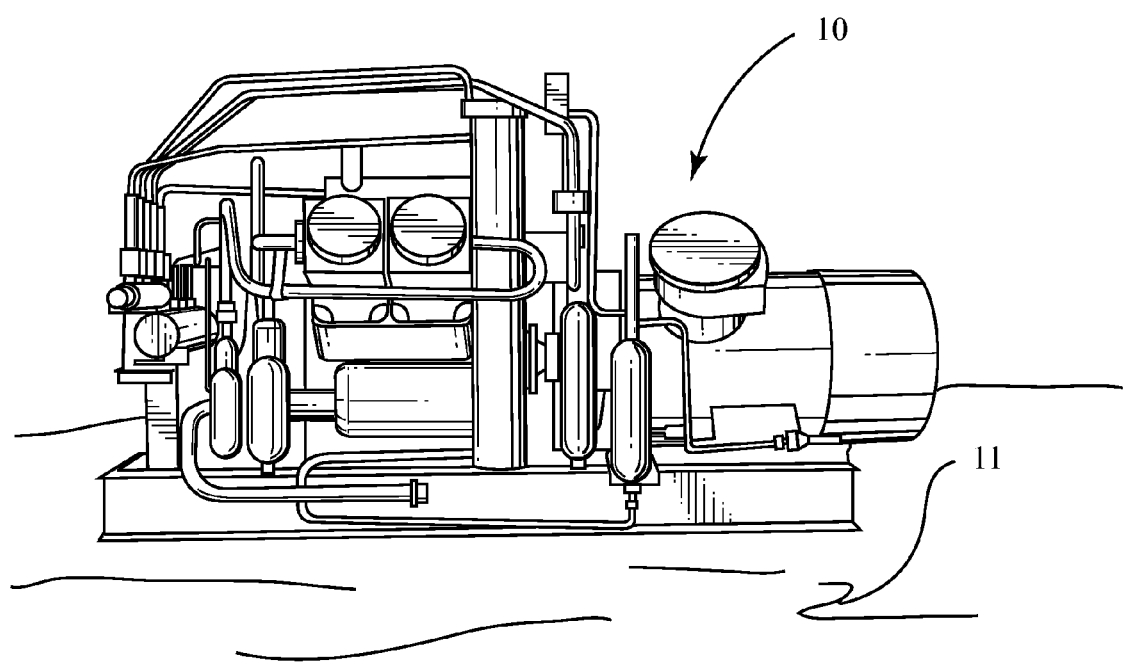
FIG. 1 illustrates a side view of a pressure regulating member located on top of a wellbore lined with a wellbore casing.

The first digit of each reference numeral in the above figures indicates the figure in which an element or feature is most prominently shown. The second digit indicates related elements or features, and a final letter (when used) indicates a sub-portion of an element or feature.

DETAILED DESCRIPTION OF THE INVENTION

FIG. 1 illustrates a side view of a pressure regulating member 10 located on top of a wellbore lined with a wellbore casing 11. The liquid hydrocarbon mixture present in the wellbore casing 11, as discussed below, is responsive to pressure changes caused by the pressure regulating member 10. The pressure regulating member 10 may be any machine that uses any industry standard means to selectively change pressure in the separation chamber 22 of the wellbore casing 11 as discussed below. In the preferred embodiment, the pressure regulating member 10 is any industry standard system comprising a compressor, relief valve, and a pressure monitoring system, whether manual or automated, and being capable of selectively forcing a gaseous composition into the wellbore casing 11 and removing said gaseous composition from the wellbore casing 11. The pressure regulating member 10 should constantly measure the internal pressure in the wellbore casing 11 and add pressure, remove pressure, or maintain a constant pressure based on experimentally determined time values and pressure patterns of the specific wellbore as described in FIG. 3 below. In an alternate embodiment, the pressure regulating member 10 does not measure the internal pressure of the wellbore casing 11 and changes pressure in cycles based solely on time. This embodiment is not preferred however, because a pressure regulating member 10 without a pressure monitoring system may increase pressure for periods in excess of the optimal amount of time for a given well resulting in increased equipment wear or reduce pressure after periods which are less than the optimal amount of time for a given well resulting in an inefficient process for reasons explained more fully below.

It should be noted that FIG. 1 is intended to illustrate the position of the pressure regulating member 10 with respect to the wellbore casing 11. The pressure regulating member 10 as depicted in FIG. 1. is present for illustrative purposes and is not intended to depict a functioning compressor and relief valve combination. As mentioned above, any compressor and relief valve combination that performs the above listed functions may be a pressure regulating member 10.

Figure 2:
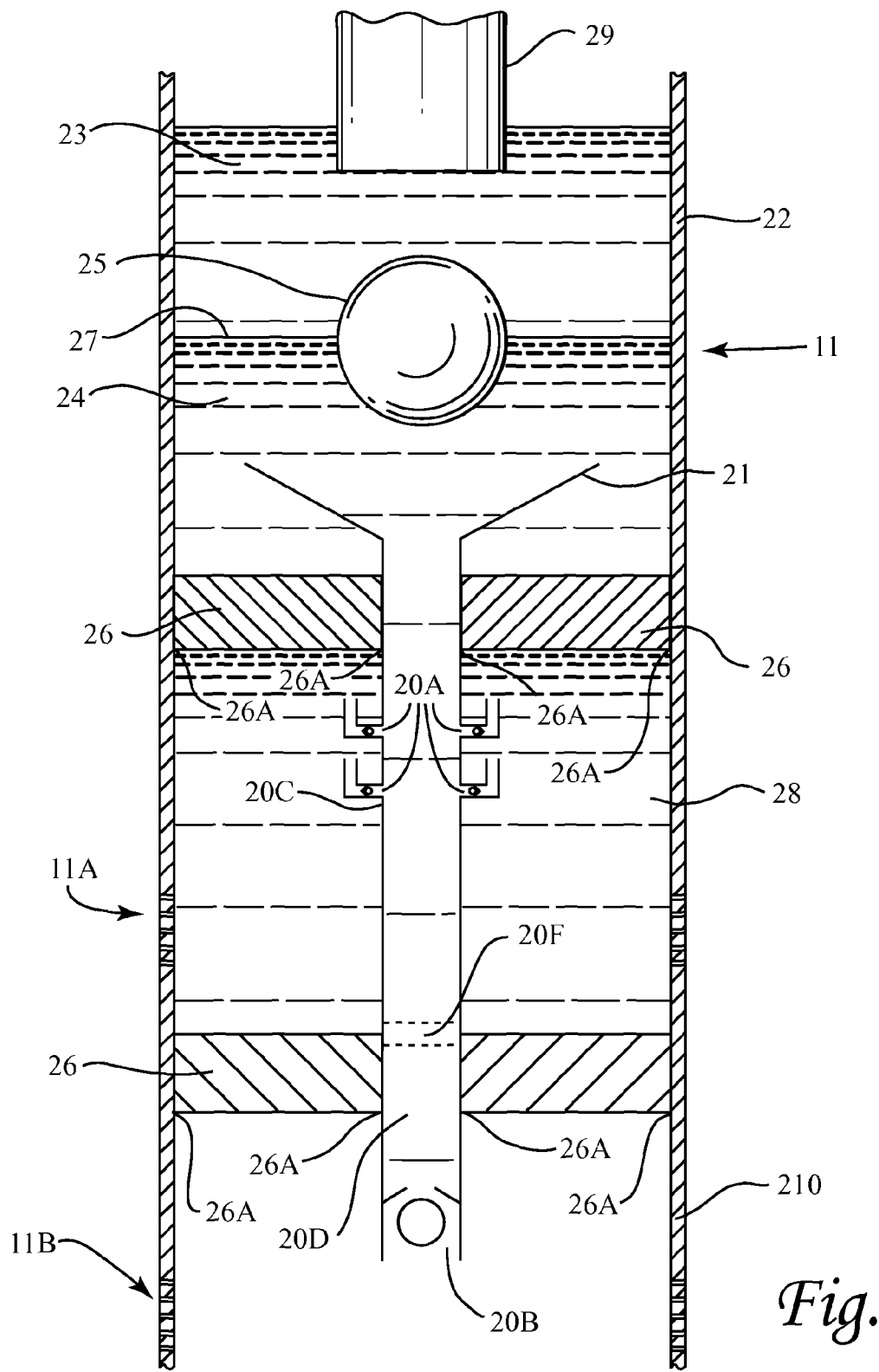
FIG. 2 illustrates a cut away view of a wellbore containing an apparatus for separating a mixture of liquids of differing specific gravities.

FIG. 2 illustrates a cut away view of a wellbore containing an apparatus for separating a mixture of liquids of differing specific gravities. In the present embodiment, the reduced pressure caused by the pressure regulating member 10 allows a mixture of liquids of differing specific gravities to be forced into the wellbore casing 11 by pressure from a known oil bearing zone through a plurality of production perforations 11A in the wellbore casing 11. In the preferred embodiment, the mixture of liquids of differing specific gravities comprises a mixture of liquid hydrocarbons, such as crude oil, and water and will hereinafter be referred to as the liquid hydrocarbon mixture. The production perforations 11A are positioned in the wellbore casing 11 to correspond to known oil-bearing zones where liquid hydrocarbon mixtures are located.

Upon entering the wellbore casing 11, the liquid hydrocarbon mixture enters an isolation chamber 28, created by the wellbore casing 11, a pair of isolation members 26, and the flow member 20. The isolation chamber 28 prevents the liquid hydrocarbon mixture from mixing with water leaving the device through disposal perforations 11B as discussed below. In the preferred embodiment, the isolation members 26 are industry standard isolation packers, but any similar device may be substituted. The isolation members 26 are positioned to form a plurality of seals 26A with the flow member 20 and a plurality of seals 26A with the wellbore casing 11 to prevent any liquid contained in the isolation chamber 28 from mixing with liquid in the separation chamber 22 or the disposal chamber 210.

The flow member 20 further comprises a plurality of production valves 20A and disposal valves 20B. In the preferred embodiment, the flow member 20 is a section of tubing connecting the isolation chamber 28, the separation chamber 22, and the disposal chamber 210. The production valves 20A should be one-way valves that allow the liquid hydrocarbon mixture to be received into the flow member 20 from the isolation chamber 28, but do not allow liquid to flow out of the flow member 20 and back into the isolation chamber 28. The disposal valves 20B should be one-way valves that allow liquids to flow out of the flow member 20 and into the disposal chamber 210, but not flow from the disposal chamber 210 into the flow member 20. This configuration of valves causes the liquid hydrocarbon mixture to enter the flow member 20 during periods of reduced pressure from the pressure regulating member 10. Furthermore, water and other liquids that have been separated through the process discussed below leave the flow member 20 through the disposal valves 20B during periods of increased pressure from the pressure regulating member 10. Due to the fact that hydrocarbons have a lower specific gravity than water, most of the liquid settling near the disposal valves 20B, being the first liquid to enter the disposal chamber 210 during periods of increased pressure, is mostly comprised of water.

Due to the fact that hydrocarbons have a lower specific gravity than water, the hydrocarbon mixture will naturally rise to the top flow member 20, through the receiving member 21, and be received into and contained by the separation chamber 22 during periods of reduced pressure. Inside the separation chamber 22, the hydrocarbon mixture will naturally separate into layers of hydrocarbons of varying specific gravities hereinafter referred to as the crude oil layer 23. The crude oil layer 23 will float on top of the water layer 24. The natural separation process will create an interface 27 between the two liquids. For this process to occur, the liquid hydrocarbon mixture must be contained in the separation chamber in an undisturbed state until the liquids have separated.

A separation member 25 is positioned inside the separation chamber 22. The separation member 25 is selected to comprise a specific gravity that is greater than the crude oil layer 23 but is less than the water layer 24. The separation member 25 will naturally sink to the bottom of the crude oil layer 23 but will float on top of the water layer 24. A separation member 25 with the proper specific gravity will naturally float in the interface 27 between the two liquids. Since the crude oil layer 23 may comprise different compounds in different wells, the separation member 25 may have a different specific gravity in different wells or in different embodiments. Also, in embodiments where different liquids are to be extracted, the separation member 25 should be selected to have a specific gravity greater than the liquid to be extracted and less than the liquids that should remain in the wellbore and be flushed through the disposal valves 20B.

A receiving member 21 is positioned inside the separation chamber 22 and connected to the flow member 20. The liquid hydrocarbon mixture flows from the flow member 20 and into the separation chamber 22 during periods of reduced pressure in the separation chamber 22. Once the liquid hydrocarbon mixture has separated into the crude oil layer 23 and the water layer 24, the pressure regulating member 10 increases the pressure in the separation chamber 22. When the pressure begins to increase due to action by the pressure regulating member 10, the water layer 24 is forced through the receiving member 21. When most of the water layer 24 has been forced into the flow member 20, the separation member 25 which was floating in the interface 27 is received by the receiving member 21. The receiving member 21 and the separation member 25 should be shaped so that a seal is created when the separation member 25 is received by the receiving member 21 during periods of increased pressure inside the separation chamber 22. The seal between the separation member 25 and the receiving member 21 prevents the liquid in the crude oil layer 23 from reentering the flow member 20. When the seal between the separation member 25 and the receiving member 21 is created, most of the liquid remaining in the separation chamber 22 consists of compounds with specific gravities that are less than the specific gravity of the separation member 25, crude oil in most embodiments.

It should be noted that the receiving member 21 and the separation member 25 may comprise many different variations other than those expressly shown in FIG. 2, and this disclosure is intended to cover and does cover those variants. The only requirement is that the separation member 25 must be capable of floating in the interface 27, and the separation member 25 and the receiving member 21 should prevent liquid flow from the separation chamber 22 to the flow member 20 when the separation member 25 is received by the receiving member 21.

When the pressure in the separation chamber 22 is increased after the hydrocarbon mixture has separated into layers, the water from the water layer 24 is forced through the receiving member 21 and received by the flow member 20. During periods of increased pressure, pressure from the separation chamber 22 forces the water in the flow member 20 to flow through the disposal valves 20B and into the disposal chamber 210 of the wellbore casing. The liquid contained in the disposal chamber 210 is isolated from the isolation chamber 28 by the isolation members 26. The isolation member seals 26A prevent the water leaving the disposal valves 20B from mixing with the liquids in the isolation chamber 28 and reentering the flow member 20 through the production valves 20A. The production valves 20A prevent the water contained in the flow member 20 from reentering the isolation chamber 28. The water in the disposal chamber 210 of the wellbore casing 11 leaves the disposal chamber 210 through disposal perforations 11B in the wellbore casing 11 and enters a disposal zone in the earth.

It should be noted that in some cases, the oil bearing zone is located below the lower isolation member and the disposal zone to be used is located beside or around the wellbore casing and above the lower isolation member. In this case, the present invention can perform the same function by reversing the direction of the flow allowed by the production valves 20A and the disposal valves 20B of the flow member 20. In this case, the production valves 20A, isolation chamber 28, and production perforations 11A as depicted function as disposal valves, disposal chamber, and disposal perforations, respectively. Meanwhile, in this embodiment, the disposal valves 20B, disposal chamber 210, and disposal perforations 11B as depicted function as production valves, isolation chamber, and production perforations, respectively. In this embodiment, the overall function of the device remains the same, however, the liquid hydrocarbon mixture enters the device from a lower portion of the wellbore casing and the remaining water layer is allowed to exit the device and enter the disposal zone from a higher portion of the wellbore casing.

The operation of the present invention is summarized hereinafter. The pressure regulating member 10 is manipulated to decrease the pressure in the separation chamber 22, and maintain said pressure at a constant level. The pressure regulating member 10 may be manipulated by a person or by an automated system. The reduced pressure created by the pressure regulating member 10 allows the liquid hydrocarbon mixture to enter the isolation chamber 28 from the oil bearing zone through production perforations 11A in the wellbore casing 11. The reduced pressure then allows the liquid hydrocarbon mixture into the flow member 20 through the production valves 20A, through the receiving member 21, and into the separation chamber 22. The constant reduced pressure in the separation chamber 22 allows the liquid hydrocarbon mixture to separate into a crude oil layer 23 and a water layer 24 once the liquid in the system reaches a steady state. The separation member 25 then floats in the interface 27 between the two liquids. After the liquids have separated, the pressure regulating member 10 is manipulated to increase the pressure in the separation chamber 22 and force the water layer 24 through the receiving member 21, into the flow member 20, through the disposal valves 20B, into the disposal chamber 210, out of the disposal perforations 11B and into a disposal zone. The increased pressure from the pressure regulating member 10 also forces the separation member 25 to form a seal with the receiving member 21 which prevents the crude oil layer 23 from escaping from the separation chamber 22. The pressure regulating member 10 may then be manipulated again to reduce the pressure in the separation chamber 22 and start the process again. Each time the process goes through a cycle, more crude oil is available in the separation chamber. Once the desired amount of water-free separated crude oil is present in the separation chamber 22, the crude may be extracted by an extraction member 29. The extraction member 29 may be any standard technology capable of pumping oil to the surface of the earth from a wellbore.

It should be noted that the extraction member 29 as depicted in FIG. 2. is intended to illustrate the lower portion of a pipe which would be connected to a pump on the surface. However, any industry standard methods of oil extraction may be used.

The preferred method of installation of the apparatus for separating a mixture of liquids of differing specific gravities in a wellbore is disclosed hereinafter. In the preferred embodiment, a wellbore that has been previously capped due to a high water to oil ratio must first be obtained. All existing equipment should be removed from the wellbore with the exception of the wellbore casing 11. Any repairs needed to restore the integrity of the wellbore casing 11 should be completed. In an alternate embodiment, a new well is drilled in a location with a high water to oil ratio and a wellbore casing installed. In another alternate embodiment, a well that is currently in use may be converted to use the present process in the manner disclosed herein.

A plurality of production perforations 11A should be created in the wellbore casing 11 at locations adjacent to the known oil bearing zones. A plurality of disposal perforations 11B should be created in the wellbore casing 11 at locations adjacent to a disposal zone. An isolation member 26 fitted to the lower portion of the flow member 20D is then installed in the wellbore casing 11 between the production perforations 11A and the disposal perforations 11B, creating the disposal chamber 210. The lower portion of the flow member 20D should be positioned so that the disposal valves 20B are positioned in the disposal chamber 210. A second isolation member 26 fitted to the upper portion of the flow member 20C should then installed in the wellbore casing 11 in a location above the highest production perforation 11A. The isolation members 26 should be installed in the wellbore casing 11 in such a way that the upper and lower portions of the flow member 20C are connected through a seal assembly 20F. The installation of the second isolation member 26 should create the separation chamber 22 above the production perforations 11A and an isolation chamber 28 in the portion of the wellbore casing 11 comprising the production perforations 11A with the production valves 20A of the flow member 20 inside said isolation chamber 28. The flow member 20 should also be connected to the receiving member 21 as discussed above. A separation member 25 selected to comprise the characteristics described above is then placed in the separation chamber 22. The pressure regulating member 10 and the extraction member 29 are then installed into the wellbore. The device may then be operated in the manner discussed below. It should be noted that the direction of the production valves 20A and the disposal valves 20B should be reversed prior to installation in cases where the disposal zone is above the lower isolation member and the production zone is below the lower isolation member as discussed above.

Figure 3:
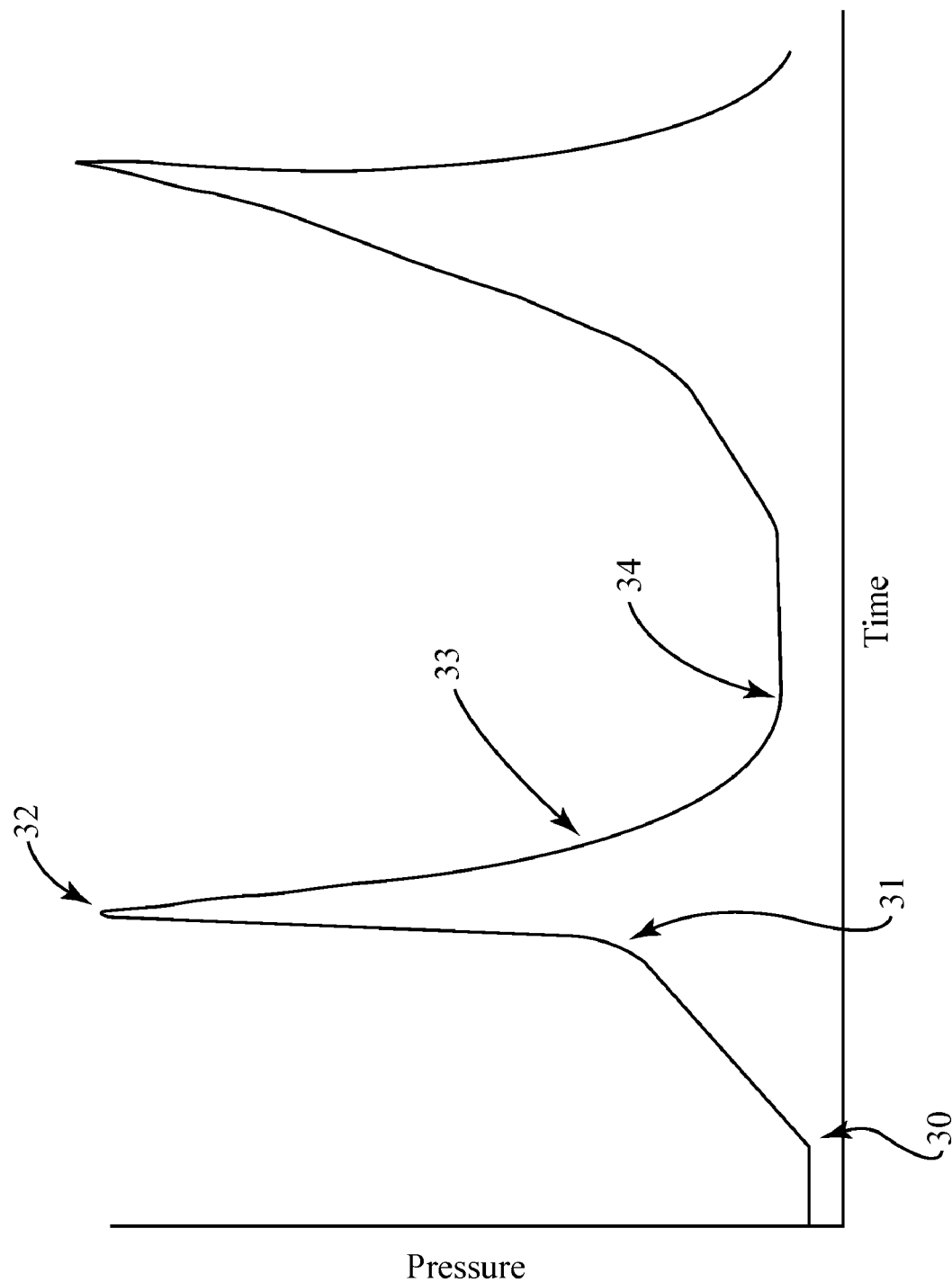
FIG. 3 illustrates a graph showing internal pressure patterns of the separation chamber 22 of the wellbore casing 11 caused by the pressure regulating member 10 over time.

FIG. 3 illustrates a graph showing internal pressure patterns of the separation chamber 22 of the wellbore casing 11 caused by the pressure regulating member 10 over time. All times noted in FIG. 3 may vary depending on the characteristics of a given wellbore, the relative concentration of liquid to be separated, and the type of liquids to be separated. Therefore, no exact times have been given and FIG. 3 is not to scale. The times noted in FIG. 3 are illustrative only and should not be construed as limiting.

When the present invention is initiated, the pressure regulating member 10 reduces pressure in the separation chamber 22 to allow the liquid hydrocarbon mixture into the chamber and allow the mixture to separate into a crude oil layer 23 and a water layer 24. After sufficient time has elapsed for the hydrocarbon mixture to separate as discussed hereinabove, shown as Time 30, the operator or operating program responsible for manipulating the pressure regulating member 10, manipulates the pressure regulating member 10 to increase pressure in the separation chamber 22. The exact Time 30 varies from well to well and should be determined by specific calculation and/or experimentation.

After Time 30, the pressure regulating member 10 increases the internal pressure in the separation chamber 22 causing water to be forced into the flow member 20 and out of the wellbore as discussed above. When substantially all the water layer 24 has been forced into the flow member 20, the separation member 25 is received by the receiving member 21 at Time 31. At Time 31 a seal is created preventing the crude oil layer 23 from leaving the separation chamber 22, and preventing transmittal of the increasing pressure outside of the separation chamber 22 through the flow member 20, causing a rapid increase in the internal pressure of the separation chamber 22.

At time 32, the operator or operating program of the pressure regulating member 10 recognizes that the water layer 24 has left the separation chamber 22, shown by the rapidly increasing internal pressure, and begins reducing the pressure from the pressure regulating member 10. The internal pressure undergoes rapid reduction until the separation member 25 loses contact with the receiving member 21 and begins to float on the hydrocarbon mixture entering from the flow member 20 at Time 33.

At Time 33 pressure from the pressure regulating member 10 reduces more slowly as the pressure begins to transmit to the downhole fluids through the flow member 20. At Time 34, the pressure has been reduced to a small constant amount that allows the hydrocarbon mixture to fill a portion of the separation chamber 22 and begin the next cycle of the separation process.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

I claim:

1. An apparatus for separating a mixture of liquids of differing specific gravities in a wellbore, comprising:
    a pressure regulating member, for forcing a plurality of gaseous compositions into the wellbore and removing said gaseous compositions from the wellbore and thereby selectively changing pressure in the wellbore;
    a separation chamber, with internal pressure responsive to the pressure regulating member, for receiving a mixture of liquids of differing specific gravities, and containing said liquids in an undisturbed state until said liquids have separated into a plurality of layers;
    a separation member, positioned inside the separation chamber, and selected to comprise a specific gravity less than a first liquid to be separated from the liquid mixture and greater than a second liquid to be separated from the liquid mixture so that said separation member floats in the interface between the two liquids;
    a receiving member, positioned inside the separation chamber, for receiving the separation member and maintaining a seal therewith when the separation chamber is under increased pressure; and
    a flow member, further comprising a plurality of disposal valves and production valves, and connected to the receiving member, for receiving a mixture of liquids of differing specific gravities through the production valves, allowing the mixture to enter the separation chamber through the receiving member prior to separation, receiving liquids of specific gravities greater than the specific gravity of the separation member, and allowing liquids of specific gravities greater than the specific gravity of the separation member to flow through the disposal valves.

2. The apparatus of claim 1, wherein the separation chamber is contained in a wellbore casing.

3. The apparatus of claim 2, wherein the pressure regulating member measures the internal pressure in the wellbore casing and selectively changes pressure based on experimentally determined time values and pressure patterns of the wellbore.

4. The apparatus of claim 2, further comprising a plurality of isolation members positioned to form a plurality of seals with the flow member and a plurality of seals with the wellbore casing.

5. The apparatus of claim 4, wherein the isolation members are positioned to form an isolation chamber in the wellbore casing around a plurality of the production valves of the flow member.

6. The apparatus of claim 5, wherein the wellbore casing further comprises a plurality of production perforations which allow liquids of differing specific gravities to enter the isolation chamber.

7. The apparatus of claim 4, wherein the isolation members are positioned to form a disposal chamber in the wellbore casing around a plurality of the disposal valves of the flow member.

8. The apparatus of claim 7, wherein the wellbore casing further comprises a plurality of disposal perforations which allow liquids leaving the disposal valves to leave the wellbore casing.

9. The apparatus of claim 1, further comprising an extraction member for extracting liquids with specific gravities that are less than the specific gravity of the separation member from the separation chamber.

10. The apparatus of claim 9, wherein the extraction member extracts liquids with specific gravities that are less than the specific gravity of the separation member after the receiving member has created a seal with the separation member.

* * * * *